United States Patent
Takahashi

(10) Patent No.: US 6,335,608 B1
(45) Date of Patent: Jan. 1, 2002

(54) FAULT PROTECTION CIRCUITRY FOR MOTOR CONTROLLERS

(75) Inventor: Toshio Takahashi, Rancho Palos Verdes, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 09/559,641

(22) Filed: Apr. 28, 2000

Related U.S. Application Data

(60) Provisional application No. 60/132,007, filed on Apr. 30, 1999, and provisional application No. 60/132,006, filed on Apr. 30, 1999.

(51) Int. Cl.⁷ .................................................. H02P 5/28
(52) U.S. Cl. ........................ 318/811; 318/434; 361/23; 363/56
(58) Field of Search .................................. 318/434, 811; 361/23; 363/56

(56) References Cited

U.S. PATENT DOCUMENTS

| | | | |
|---|---|---|---|
| 5,173,848 A | * 12/1992 | Roof | 363/56 |
| 5,416,692 A | * 5/1995 | Shimzu et al. | 363/98 |
| 5,684,681 A | * 11/1997 | Huh | 363/26 |
| 5,771,162 A | * 6/1998 | Kwon | 363/56 |
| 5,929,665 A | * 7/1999 | Ichikawa et al. | 327/109 |
| 6,097,582 A | * 8/2000 | John et al. | 361/79 |

* cited by examiner

Primary Examiner—Robert E. Nappi
Assistant Examiner—Rita Leykin
(74) Attorney, Agent, or Firm—Ostrolenk, Faber, Gerb & Soffen, LLP

(57) ABSTRACT

Fault protection circuitry for motor controllers includes a soft shutdown circuit and a short circuit protection circuit. Soft shutdown of all six switching devices in a motor controller inverter occurs in the event of a fault condition. Consequently, no additional switching action takes place, avoiding a false turn-on problem due to additional switching and the associated Miller effect. Short-circuit protection circuitry senses the $V_{CE}$ of the IGBT using DESAT circuitry in the gate driver IC. Upon the occurrence of a short-circuit, the IGBT is pulled out of its low on-state voltage and the output characteristics are driven up. DESAT function is provided for each high side IGBT; however, it is enabled only when the IGBT is on.

1 Claim, 4 Drawing Sheets

FAULT PROTECTION CIRCUITRY FOR MOTOR CONTROLLERS

This application claims the benefit of U.S. Provisional Application No. 60/132,006 filed Apr. 30, 1999, and U.S. Provisional Application No. 60/132,007 filed Apr. 30, 1999.

BACKGROUND OF THE INVENTION

1. Field of the Invention

The present invention relates to fault protection circuitry for a motor controller circuit and, more specifically, to a soft shutdown circuit responsive to an overcurrent condition (such as a short circuit) in the motor controller, and a desaturation short circuit protection circuit for the motor controller.

2. Description of the Related Art

Referring to FIG. 1, a prior art pulse width modulated motor controller inverter circuit 2 is shown. Motor controller circuit 2 is a three phase motor controller bridge that includes six IGBT or FET switching devices 4, 6, 8, 10, 12, and 14. The switching devices are switched by an appropriate pulse width modulated (PWM) waveform generated by gate drive circuitry contained in control block 16. Each switch pair (U: 4 and 6, V: 8 and 10, W: 12 and 14) includes a high side switch (4, 8, 12) and a low side switch (6, 10, 14), respectively. The switches typically are controlled such that when the high side switch is on, the low side switch is off, and vice versa.

A typical waveform for inverter circuit 2 is shown in the state diagram of FIG. 2. The high state of the U, V, and W signals indicates that the high side switch is on and the low side switch is off within the corresponding leg, and the low state of each leg signal represents that the high side switch of the corresponding leg is off and the low side switch of that leg is on.

FIG. 3 is a simplified functional diagram of the prior art inverter circuit 2 illustrating the state of switches 4, 6, 8, 10, 12, and 14 at the moment of an over-current condition labeled OC in FIG. 2. Typically, in the prior art circuit, when an over-current condition is detected, only the closed or conducting switching devices (4, 10, and 14) are softly turned-off and put in a weakly pulled down condition, while the other switches (6, 8, and 12) remain active and follow the incoming PWM gate input signals.

Consequently, when the phase V leg makes a transition from low to high after the OC condition shown in FIG. 2, the voltage potential at the point between switches 8 and 10 will make a fast transition from DCBUS(−) to DCBUS(+) as a result of switch 8 turning on. This fast switching of switch 8 can cause an induced turn-on of switch 10, creating a new shoot-through short circuit condition due to the Miller capacitance combined with the soft shutdown high impedance placed on the switch 10 gate.

Another problem associated with a typical motor controller inverter circuit, such as that shown in FIG. 1, is that an earth-fault can occur as a result of insulation breakdown. This can create a short-circuit by contact with the chassis. During an earth-fault condition, the short-circuit current does not flow in the negative DC bus rail; thus, only the high-side switches need protection against an earth fault.

Referring to FIG. 4, an equivalent prior art circuit 17 of the earth-fault short circuit is shown. During the earth fault, the rate of rise of the current depends on the inductance L of the current path between the voltage source 18 and the power transistor 19; however, inductance L of the current path cannot be predicted by the circuit designer, as it depends on the actual location of the insulation breakdown.

Referring to FIG. 5, a conventional approach to earth-fault detection consists of a sense resistor 20 disposed on the positive DC bus rail. An optocoupler 22 provides high side/low side isolation and transfers the fault information to the low side. The inverter shuts down when the positive DC bus rail current exceeds a trip level of fault detection circuitry. The trip level should be set at a level that accurately defines the occurrence of a fault condition. The implementation is relatively simple.

One problem with the prior art earth-fault detection scheme of FIG. 5 is that the large inductance slows down the rate of rise of current, which then takes too long to build up to the trip level. See FIG. 6. As a result, high current passes through the IGBT transistor switch, which can result in excessive power dissipation and increase the temperature beyond the limits of the silicon. Thus, the IGBT can be damaged before fault detection occurs.

SUMMARY OF THE INVENTION

The circuitry of the present invention overcomes problems in the prior art, such as those noted above, by implementing a soft shutdown of all six switching devices of a motor controller circuit upon the occurrence of a fault condition, terminating all switching action. Consequently, there is no potential false turn-on problem due to additional switching and the associated Miller effect. In addition, the present invention provides circuitry for short-circuit protection that senses the $V_{CE}$ of a power transistor switching device using DESAT circuitry in a gate driver IC. Upon the occurrence of a short-circuit, the power transistor switch is pulled out of its low on-state voltage and the output characteristics are driven up. The DESAT function is provided for each high side IGBT; however, it is enabled only when the IGBT is on.

Other features and advantages of the present invention will become apparent from the following description of the invention which refers to the accompanying drawings.

DETAILED DESCRIPTION OF THE PREFERRED EMBODIMENTS

Figure 7:
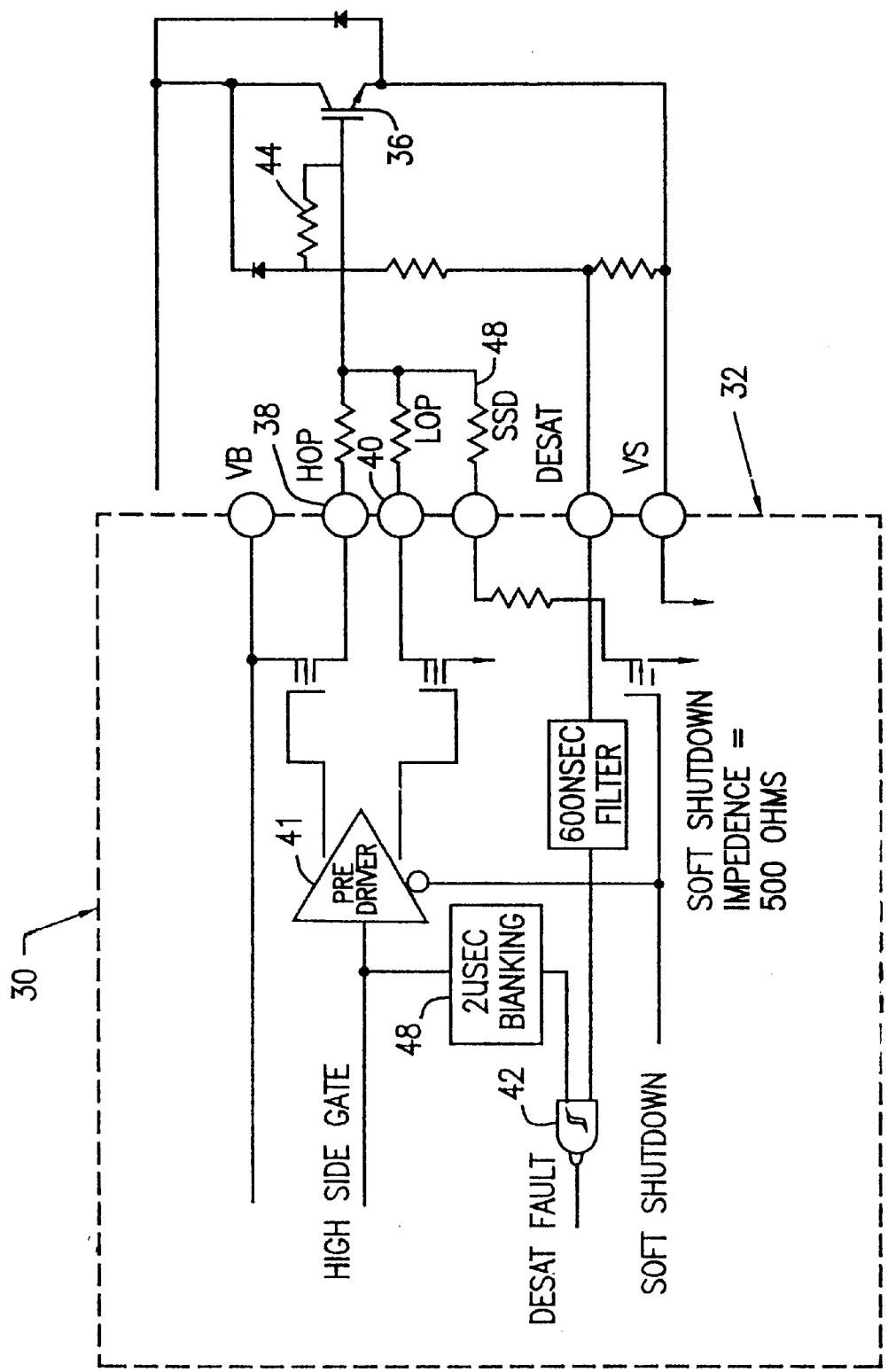
FIG. 7 is a block diagram of a driver output circuit according to the present invention.

Referring to FIG. 7, a block diagram of a gate driver output circuit 30 according to the present invention is shown. Circuit 30 includes drive circuit block 32 connected to IGBT switch 36. Drive circuit block 32 provides a pulse width modulated waveform switching in a high side driver pull up output 38 and a low side driver pull up output 40 in accordance with signals generated by the gate driver IC and delivered by way of pre-driver 41.

Figure 1:
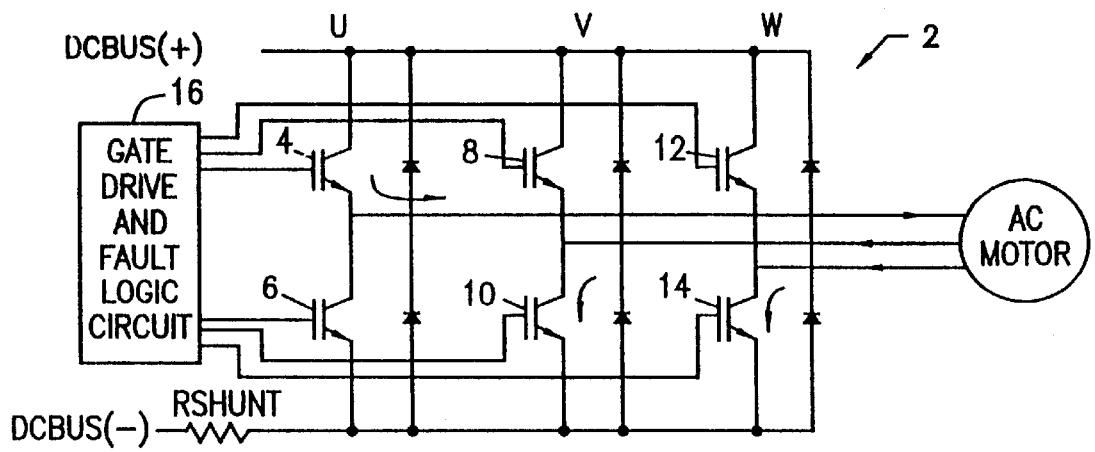
FIG. 1 shows a typical prior art pulse width modulated three phase AC motor controller inverter circuit.
Figure 2:
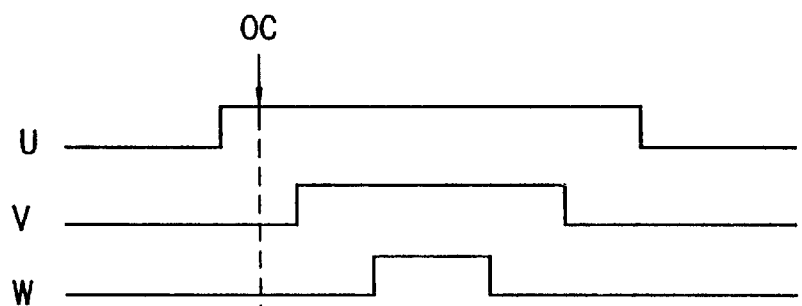
FIG. 2 is a waveform diagram for a motor controller circuit.
Figure 3:
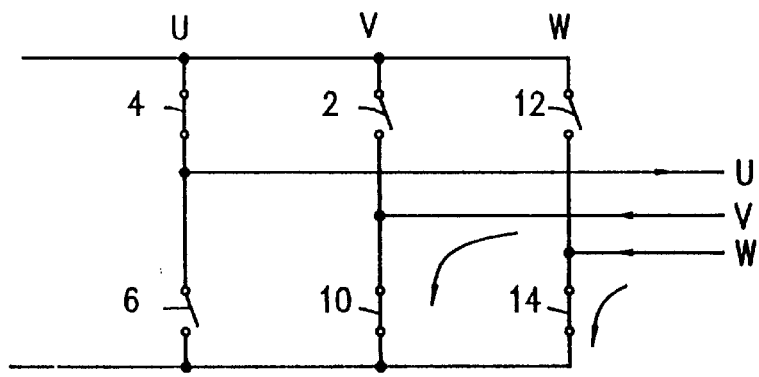
FIG. 3 shows the state of the switches in the circuit of FIG. 1 at the moment of an overcurrent condition identified as "OC" in FIG. 2.
Figure 4:
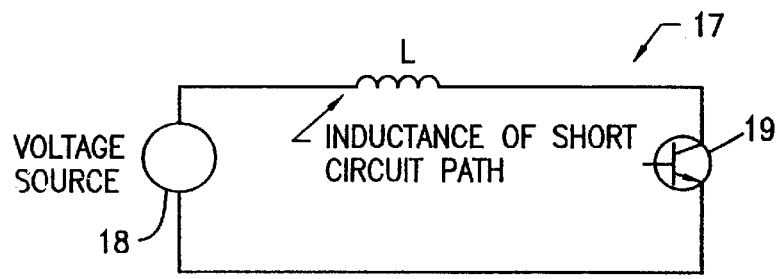
FIG. 4 shows an equivalent circuit of an earth-fault short circuit in the motor controller of FIG. 1.
Figure 5:
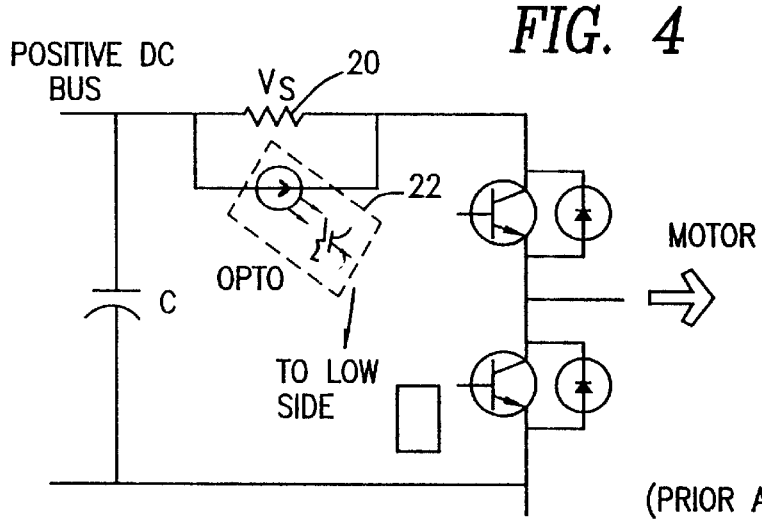
FIG. 5 illustrates schematically a conventional earth-fault detection approach using a sense resistor on the high-side bus and an optocoupler.
Figure 6:
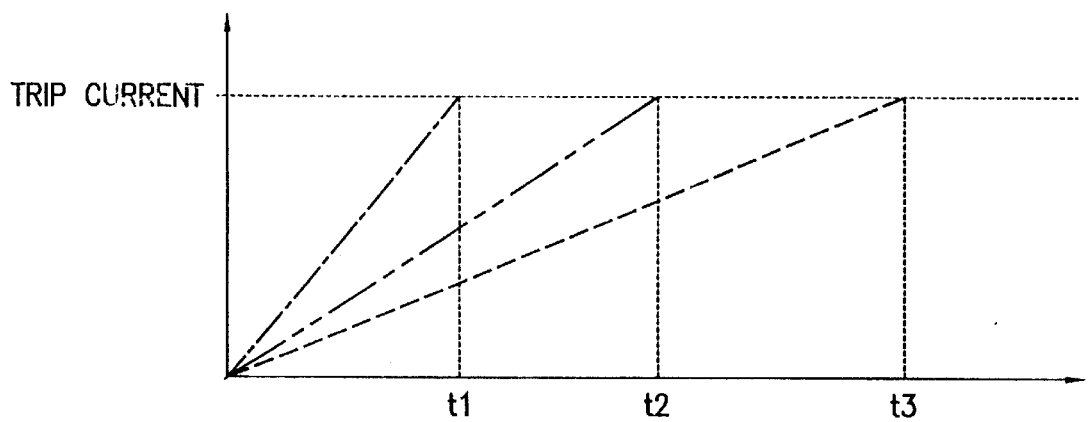
FIG. 6 shows the result of a large inductance in the short circuit path, which disadvantageously slows down the rate of current rise.

When an over-current condition occurs, such as a line-to-line short condition between phase "U" and "V" (FIGS. 1 and 2), for example, a detection signal is first transferred to a DESAT fault logic circuit 42. The over-current detection can be sensed either by the saturation voltage across switch 36, the voltage across a sense resistor 44, or both. Once the fault logic circuit recognizes the over-current condition, it will initiate a "soft" shutdown action to switch 36.

The switch is slowly turned off by switching in a high impedance series resistor 48 to the gate drive circuit. After transition of the slow turn-off, the gate input of each switching device is weakly pulled down and this condition remains until a fault reset signal is applied to the fault logic circuit. Therefore, no additional switching action will occur in the shutdown mode, even with the activated and pending PWM signal inputs shown in FIG. 2 as dashed lines. Consequently, there is no potential false turn-on problem due to additional switching and the associated Miller effect. Accordingly, when a short-circuit occurs, the IGBT 36 is pulled out of its low on-state voltage and the output characteristics are driven up. A blanking time of 2 μs 50 (FIG. 7) allows the IGBT to fully turn on. A DESAT function is provided for each high side IGBT; however, it is enabled only when the IGBT is on.

Sense resistor 44 optionally is included in the circuitry external to the gate driver IC. Resistor 44 provides two advantages over a circuit without a sense resistor 44:

1. Faster shut off, in particular when the current rise is relatively slow.

2. The DESAT pin voltage contains not only the IGBT saturation voltage but also the short circuit current information. The amount of short circuit current can be determined by the sense resistor 44 value and the resistor divider network to the DESAT pin in addition to the $V_{CE}(SAT)$ voltage.

The detection level of the circuitry must be set above the maximum $V_{CE}(ON)$ of the IGBT when the IGBT is pulling out of saturation.

Figure 8:
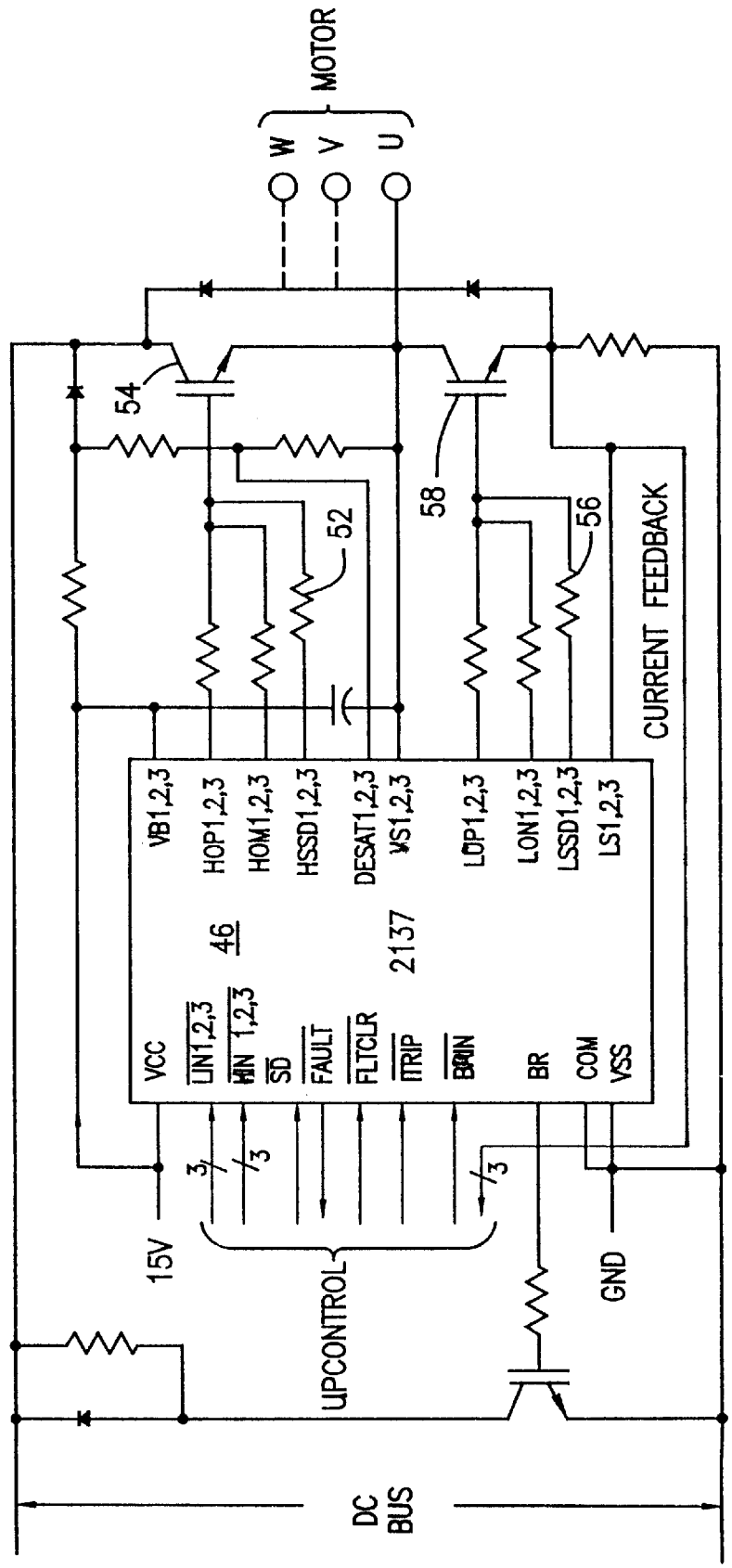
FIG. 8 is a circuit diagram showing a desaturation short-circuit protection approach of the present invention.

FIG. 8 illustrates a gate driver integrated circuit 46 utilizing the driver output circuit of FIG. 7, as implemented in the IR2137 3-phase bridge driver IC manufactured by International Rectifier of El Segundo, Calif.

As an example of the present invention, normally the voltage across the resistor 44 $VR_{SENSE} \approx 1.0V$, and $V_{CE}(SAT) \approx 1.8V$. If a ground fault (a dead short) occurs, $VR_{SENSE} \approx 3.0V$ and $V_{CE}(SAT) \approx 5.0V$. A voltage of 8.0V at the DESAT pin will cause the gate shutdown circuit to trip, turning off the gate drive. Preferably, the soft shutdown is initiated as described above, which inserts a high impedance resistor 36 in the gate drive circuit for each of the power transistors being controlled by the gate drive circuit. In the configuration for a pair of such power transistors, as shown in FIG. 8, the soft shutdown signal will cause the gate drive circuit to insert a high impedance resistor 52 to the gate of high side switch 54, and a high impedance resistor 56 to the gate of low side switch 58.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A motor controller comprising:

a power transistor switching device switched by a gate driver circuit generating a pulse width modulated waveform as a gate drive signal;

a soft shutdown circuit responsive to an over-current condition in the motor controller which switches a high impedance resistor into the path of the gate drive signal of the power transistor switching device; and circuitry for sensing the $V_{CE}$ of the power transistor switching device, and transmitting a fault signal using DESAT circuitry in the gate driver circuit for responding to a short circuit condition.

\* \* \* \* \*